(12) United States Patent
Wilkins et al.

(10) Patent No.: US 11,584,591 B2
(45) Date of Patent: *Feb. 21, 2023

(54) MULTI-BELT CONVEYOR SYSTEM WITH REMOVABLE CARTRIDGES

(71) Applicant: Intelligrated Headquarters, LLC, Mason, OH (US)

(72) Inventors: John Joseph Wilkins, Erlanger, KY (US); Zachary Lee Robbe, Cincinnati, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/192,251

(22) Filed: Mar. 4, 2021

(65) Prior Publication Data
US 2021/0188563 A1  Jun. 24, 2021

Related U.S. Application Data

(63) Continuation of application No. 16/528,987, filed on Aug. 1, 2019, now Pat. No. 10,988,319.

(51) Int. Cl.
*B65G 23/36* (2006.01)
*B65G 15/12* (2006.01)
(Continued)

(52) U.S. Cl.
CPC ............. *B65G 23/36* (2013.01); *B65G 15/12* (2013.01); *B65G 15/24* (2013.01); *B65G 21/06* (2013.01);
(Continued)

(58) Field of Classification Search
CPC ........ B65G 23/36; B65G 15/12; B65G 15/24; B65G 21/06; B65G 47/31;
(Continued)

(56) References Cited

U.S. PATENT DOCUMENTS

| 4,925,009 A | 5/1990 | Hill |
| 5,738,202 A | 4/1998 | Ydoate et al. |

(Continued)

FOREIGN PATENT DOCUMENTS

| CN | 102897484 A | 1/2013 |
| CN | 105947537 A | 9/2016 |

(Continued)

OTHER PUBLICATIONS

U.S. Appl. No. 16/528,987, filed Aug. 1, 2019, U.S. Pat. No. 10/988,319, Patented.

(Continued)

*Primary Examiner* — Mark A Deuble
(74) *Attorney, Agent, or Firm* — Alston & Bird LLP

(57) ABSTRACT

A multi-belt conveyor is described. The multi-belt conveyor comprises a base assembly comprising a base frame that extends along a length of the multi-belt conveyor. Further, the multi-belt conveyor comprises a conveyor bed having a plurality of cartridges positioned adjacently to each other and mounted to the base frame. In this regard, each cartridge of the plurality of cartridges comprises a set of conveyor belts configured to move in a direction along the conveyor bed at a defined speed. Further, in accordance with example embodiments, a cartridge of the plurality of cartridges is configured to be removed from the conveyor bed without removing an adjacent cartridge from the plurality of cartridges. Further, each cartridge of the multi-belt conveyor comprises an actuation assembly comprising: a drive pulley, a roller-slider bed comprising a plurality of rollers, and the set of conveyor belts mounted around the roller-slider bed and the drive pulley.

16 Claims, 7 Drawing Sheets

(51) Int. Cl.
  *B65G 15/24* (2006.01)
  *B65G 21/06* (2006.01)
  *B65G 47/31* (2006.01)

(52) U.S. Cl.
  CPC ........ *B65G 47/31* (2013.01); *B65G 2811/092* (2013.01)

(58) Field of Classification Search
  CPC .............. B65G 2811/092; B65G 23/04; B65G 47/268; B65G 2207/30; B65G 15/22; B65G 15/58; B65G 15/60; B65G 23/22; B65G 23/44; B65G 47/22; B65G 2201/025; B65G 47/30
  See application file for complete search history.

(56) References Cited

U.S. PATENT DOCUMENTS

| | | | |
|---|---|---|---|
| 5,871,085 | A | 2/1999 | Shigeru |
| 8,196,737 | B2 | 6/2012 | Brayman et al. |
| 9,457,487 | B2 | 10/2016 | Mayer |
| 10,836,581 | B2 * | 11/2020 | DeGroot ................ B65G 23/44 |
| 10,988,319 | B2 * | 4/2021 | Wilkins ................ B65G 23/36 |
| 2001/0040087 | A1 | 11/2001 | Thurston et al. |
| 2004/0104100 | A1 | 6/2004 | Schiesser et al. |
| 2006/0252591 | A1 | 11/2006 | Winkelmolen et al. |
| 2007/0187211 | A1 | 8/2007 | Vertogen et al. |
| 2010/0012464 | A1 | 1/2010 | Schiesser et al. |
| 2010/0219050 | A1 * | 9/2010 | Deyanov ................ B65G 21/06 198/842 |
| 2018/0057271 | A1 | 3/2018 | Vitalini |
| 2019/0359428 | A1 | 11/2019 | Specht |
| 2020/0198896 | A1 * | 6/2020 | Treise .................... B65G 23/24 |
| 2021/0229922 | A1 * | 7/2021 | Castronuovo .......... B65G 21/06 |

FOREIGN PATENT DOCUMENTS

| | | |
|---|---|---|
| CN | 205855143 U | 1/2017 |
| CN | 107399552 A | 11/2017 |
| CN | 206901169 U | 1/2018 |
| CN | 108584285 A | 9/2018 |
| CN | 109132370 A | 1/2019 |
| CN | 208378379 U | 1/2019 |
| DE | 102013206510 A1 | 6/2014 |
| DE | 102016107997 A1 | 11/2017 |
| EP | 0146496 A1 | 6/1985 |
| EP | 0818406 A1 | 1/1998 |
| JP | 2000-153911 A | 6/2000 |
| JP | 2000-301076 A | 10/2000 |
| KR | 10-2018-0038127 A | 4/2018 |
| KR | 2018-0038127 A | 4/2018 |

OTHER PUBLICATIONS

Corrected Notice of Allowability (PTOL-37) dated Jan. 8, 2021 for U.S. Appl. No. 16/528,987.
Extended European Search Report issued in European Application No. 20186822.1 dated Dec. 4, 2020, 8 pages.
Final Rejection dated Oct. 6, 2020 for U.S. Appl. No. 16/528,987.
Non-Final Rejection dated Apr. 23, 2020 for U.S. Appl. No. 16/528,987.
Notice of Allowance and Fees Due (PTOL-85) dated Dec. 8, 2020 for U.S. Appl. No. 16/528,987.
Office Action issued in Chinese Application No. 202010591295 dated Oct. 21, 2021, 13 pages.
CN Office Action dated Jun. 9, 2022 for CN Application No. 202010591295.
English Translation of CN Office Action dated Jun. 9, 2022 for CN Application No. 202010591295.
CN Notice of Allowance dated Nov. 24, 2022 for CN Application No. 202010591295.
English translation of CN Notice of Allowance dated Nov. 24, 2022 for CN Application No. 202010591295.
Lihua Pneg, Development and Application of Belt Conveyor Moving Device, China New Technologies and Products, Feb. 25, 2013, pp. 8-9, vol. 4, China (English Abstract Submitted).

* cited by examiner

700

702 — POSITIONING, A CARTRIDGE OVER A BASE FRAME OF A MULTI-BELT CONVEYOR, THE CARTRIDGE COMPRISING: A SLIDER-ROLLER BED COMPRISING A PLURALITY OF ROLLERS, AT LEAST A DRIVE PULLEY CONFIGURED TO BE ROTATED ABOUT AN AXIS, AND A SET OF CONVEYOR BELTS MOUNTED AROUND THE SLIDER-ROLLER BED AND THE DRIVE PULLEY AND CONFIGURED TO MOVE OVER THE SLIDER-ROLLER BED IN RESPONSE TO ROTATION OF THE DRIVE PULLEY AND THE PLURALITY OF ROLLERS;

704 — MOUNTING THE CARTRIDGE OVER THE BASE FRAME OF THE MULTI-BELT CONVEYOR BY AN ENGAGEMENT OF A CARTRIDGE BASE FRAME OF THE CARTRIDGE WITH A SECTION OF THE BASE FRAME; AND

706 — INSTALLING, A TIMING BELT BETWEEN THE CARTRIDGE AND THE BASE FRAME TO MECHANICALLY CONNECT THE DRIVE PULLEY OF THE CARTRIDGE WITH A SHAFT OF A DRIVE MOTOR OF THE MULTI-BELT CONVEYOR;

FIG. 7

MULTI-BELT CONVEYOR SYSTEM WITH REMOVABLE CARTRIDGES

RELATED APPLICATIONS

This application is a continuation of, and claims priority to U.S. application Ser. No. 16/528,987 filed on Aug. 1, 2019 entitled "A MULTI-BELT CONVEYOR SYSTEM WITH REMOVABLE CARTRIDGES, the entirety of which is incorporated by reference herein.

TECHNOLOGICAL FIELD

Example embodiments described herein relate generally to a multi-belt conveyor system, and, more particularly, to a multi-belt conveyor system comprising removable cartridges.

BACKGROUND

Generally, in material handling environments, a material handling system can convey, handle, sort, and organize various type of items (e.g. cartons, cases, containers, shipment boxes, totes, packages, polybags, jiffy packaging, and/or the like) at high speeds. Depending on a configuration of a material handling system, the items may travel through the material handling environment in an unregulated manner or may be repositioned, reoriented, and/or consolidated into a single stream of items, as the items move on conveyors. Typically, in such material handling environments, it is often desired to create gaps between items, as the items are being conveyed on a conveyor bed of a conveyor. Establishing a correct gap between items within a continuously flowing train of items on the conveyor has associated challenges.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relates to a multi-belt conveyor comprising a base assembly that can comprise a base frame that extends along a length of the multi-belt conveyor. Further, the multi-belt conveyor can comprise a conveyor bed having a plurality of cartridges positioned adjacent to each other and mounted to the base frame. In this regard, each cartridge of the plurality of cartridges can comprise a set of conveyor belts configured to move in a direction along the conveyor bed at a defined speed. Further, in accordance with some example embodiments, a cartridge of the plurality of cartridges can be configured to be removed from the conveyor bed without removing an adjacent cartridge from the plurality of cartridges.

In some example embodiments, each cartridge of the multi-belt conveyor can comprise an actuation assembly comprising a drive pulley that may be rotated about an axis. Further, each cartridge comprises: a roller-slider bed that can comprise a plurality of rollers that can be rotated by the actuation assembly and the set of conveyor belts mounted around the roller-slider bed and the drive pulley. In this regard, the set of conveyor belts can be configured to move over the roller-slider bed in response to rotation of the drive pulley and the plurality of rollers.

According to said example embodiments, the actuation assembly can further comprise a sprocket wheel that can be mechanically coupled to a ball bearing and a shaft of the drive pulley. The sprocket wheel can be configured to be rotated by actuation of the actuation assembly. In this aspect, actuation of the actuation assembly can comprise: a movement of a timing belt mounted around the sprocket wheel to cause rotation of the sprocket wheel, the ball bearing, and the shaft of the drive pulley. In some example embodiments, the actuation assembly can be actuated by a drive motor mounted to the base frame. In this regard, in accordance with said example embodiments, the timing belt can be mounted around the sprocket wheel of the cartridge and a sprocket comprising a bushing mechanically coupled to a shaft of the drive motor.

According to some example embodiments, the plurality of cartridges of the multi-belt conveyor can comprise: a first cartridge that can be removably mounted to the base frame and a second cartridge that can be removably mounted to the base frame. The first cartridge can comprise: a first actuation assembly that can comprise at least a first drive pulley, a first roller-slider bed comprising a first set of rollers that can be rotated by the first actuation assembly, and a first set of conveyor belts mounted around the first roller-slider bed and the first drive pulley. In this regard, the first set of conveyor belts can be moved in response to rotation of the first set of rollers and the first drive pulley of the first actuation assembly. In accordance with said example embodiments, the second cartridge can comprise: a second actuation assembly comprising at least a second drive pulley, a second roller-slider bed comprising a second set of rollers that can be rotated by the actuation assembly, and a second set of conveyor belts mounted around the second roller-slider bed and the second drive pulley. In accordance with said example embodiments, the first set of conveyor belts can be configured to be moved over the first set of the rollers at a first speed and the second set of the conveyor belts can be configured to be moved over the second set of rollers at a second speed different from the first speed, to create a gap between items on the conveyor bed of the multi-bed conveyor.

In accordance with some example embodiments, each cartridge can comprise a cartridge frame defined by a cartridge frame top and a cartridge frame base. In this regard, the cartridge frame base can be mechanically coupled to the cartridge frame top by a spring pin and a nut and bolt assembly. The cartridge frame base can be defined at an angle relative to the cartridge frame top. Further, each cartridge can also comprise a machined cross member comprising a groove configured to support positioning of the plurality of rollers of the roller-slider bed on the machined cross member. The machined cross member can be configured to engage with the cartridge frame top.

In some example embodiments, the cartridge can be configured to be removably mounted over the base assembly by: (i) positioning the cartridge over the base assembly so that the cartridge frame base is positioned in a defined orientation over a portion of the base frame, (ii) engaging the cartridge frame base with the base frame by a nut and bolt assembly; and (iii) engaging a T-bolt between the cartridge and another cartridge positioned adjacently to the cartridge.

According to some example embodiments, the multi-belt conveyor can comprise a plurality of T bolts. In this regard, each T bolt can be configured to engage cartridge frame tops of two adjacently positioned cartridges of the plurality of cartridges.

In some example embodiments, the base assembly of the multi-belt conveyor can comprise a drive motor mounted to the base frame. The drive motor can comprise a shaft that may pass through at least a portion of the base frame. Further, the base assembly can comprise a sprocket comprising a bushing mechanically coupled to the shaft of the drive motor and a tensioning plate that may be positioned between the sprocket and the base frame. In some examples, the tensioning plate can comprise a plurality of slots configured to receive a plurality of front face bolts to engage the tensioning plate on the base frame.

According to some example embodiments a cartridge of the plurality of the cartridges of the multi-belt conveyor can be configured to control a position of the cartridge frame base to a conveying surface defined by the conveyor bed based on engagement of the cartridge frame top with the cartridge frame base and the base frame, and engagement of the cartridge frame top with the machined cross member.

In some example embodiments, the cartridge can comprise a conveyor belt tensioning assembly that can comprise a first tensioning plate and a first tensioning bolt. The conveyor belt tensioning assembly can be configured to adjust a tension of the set of conveyor belts mounted around the drive pulley and the roller-slider bed. Further, in said example embodiments, the base assembly can comprise a timing belt tensioning assembly that can comprise a second tensioning plate and a second tensioning nut. The timing belt tensioning assembly can be configured to adjust a tension of the timing belt mounted around the sprocket wheel of the cartridge and the sprocket wheel having the bushing at the base assembly.

Some example embodiments described herein relates to a cartridge of a multi-belt conveyor. The cartridge can comprise an actuation assembly that can comprise at least a drive pulley configured to be rotated about an axis. Further, the cartridge can comprise a roller-slider bed comprising a plurality of rollers that can be rotated by the actuation assembly. The cartridge can further comprise a set of conveyor belts mounted around the roller-slider bed and the drive pulley and configured to move over the roller-slider bed in response to rotation of the drive pulley and the plurality of rollers. In accordance with said example embodiments, the cartridge can further comprises a cartridge frame comprising a cartridge frame base that can be removably mounted in a section of a conveyor bed defined by the multi-bed conveyor.

In some example embodiments, the cartridge can be removably mounted to a base frame of the multi-belt conveyor comprising the conveyor bed defined by a plurality of conveyor belts. In this regard, each conveyor belt of the plurality of conveyor belts can be configured to operate in a direction along the conveyor bed at one of: a same speed or at a different speed, or a at same acceleration or at a different acceleration or at a same deacceleration or at a different deacceleration, at which remaining conveyor belts of the plurality of conveyor belts of respective cartridges are to be operated.

In some example embodiments, the cartridge can further comprise a cartridge frame top. In this regard, the cartridge can be configured to be removably mounted to a base assembly of the multi-belt conveyor by: (i) positioning the cartridge over a base frame of the base assembly so that the cartridge frame base is positioned at in a defined orientation over a portion of the base frame, (ii) engaging the cartridge frame base with the base frame by a nut and bolt assembly, and (iii) engaging a T-bolt between the cartridge frame top of the cartridge and another cartridge frame top of another cartridge positioned adjacently to the cartridge on the multi-belt conveyor.

In some example embodiments, the actuation assembly of the cartridge can comprise a sprocket wheel. The sprocket wheel can be mechanically coupled to a ball bearing and a shaft of the drive pulley. The sprocket wheel can be configured to be rotated by actuation of the actuation assembly which can comprise: movement of a timing belt mounted around the sprocket wheel to cause rotation of the sprocket wheel, the ball bearing, and the shaft of the drive pulley.

In some example embodiments, the cartridge can be removably mounted in the section of the multi-belt conveyor based on engagement of the cartridge frame base with the base frame. In this regard, the cartridge can be mounted in the section of the multi-belt conveyor so that the roller-slider bed defined by the plurality of rollers of the cartridge can align with a conveying surface defined by the conveyor bed of the multi-belt conveyor.

In some example embodiments, the cartridge can further comprise a conveyor belt tensioning assembly. The conveyor belt tensioning assembly can comprise a tensioning plate and tensioning bolt that can be configured to adjust a tension of the set of conveyor belts mounted around the drive pulley and the roller-slider bed.

Some example embodiments described herein relates to a method for configuring a multi-belt conveyor. The method can comprise positioning a cartridge over a base frame of a multi-belt conveyor. In this regard, the cartridge can comprise: a roller-slider bed comprising a plurality of rollers, at least a drive pulley configured to be rotated about an axis, and a set of conveyor belts mounted around the roller-slider bed and the drive pulley. The set of conveyor belts can be configured to move over the roller-slider bed in response to rotation of the drive pulley and the plurality of rollers. The method can further comprise mounting the cartridge over the base frame of the multi-belt conveyor by an engagement of a cartridge frame base of the cartridge with a section of the base frame. Further, the method can comprise installing a timing belt between the cartridge and the base frame to mechanically couple the drive pulley of the cartridge with a shaft of a drive motor of the multi-belt conveyor.

In some example embodiments, the method further comprises, removing the cartridge mounted to the base frame of the multi-belt conveyor by: (i) un-fastening front facing bolts to loosen engagement of a tensioning plate through which the drive motor of the multi-belt conveyor is mounted to the base frame, (ii) loosening a tension of the timing belt mounted around a sprocket wheel of the cartridge and a sprocket comprising a bushing that can be mechanically coupled to a shaft of the drive motor, (iii) disengaging a nut and bolt assembly that engages the cartridge frame base with the section of the base frame, and (iv) un-mounting the cartridge from the base frame of the conveyor.

According to said example embodiments, the cartridge can comprise a cartridge frame top defined at an angle with the cartridge frame base. In this regard, the cartridge frame base can be positioned at in a defined orientation to mate with the section of the base frame and engage with the base frame, via a nut and bolt assembly. Further, the cartridge can also comprise, a machined cross member comprising a groove configured to support positioning of the plurality of rollers of the roller-slider bed on the machined cross member. The machined cross member can be configured to engage with the cartridge frame top.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 illustrates a flowchart representing a method for mounting a cartridge of a multi-belt conveyor, in accordance with some example embodiments described herein.

DETAILED DESCRIPTION

Figure 1:
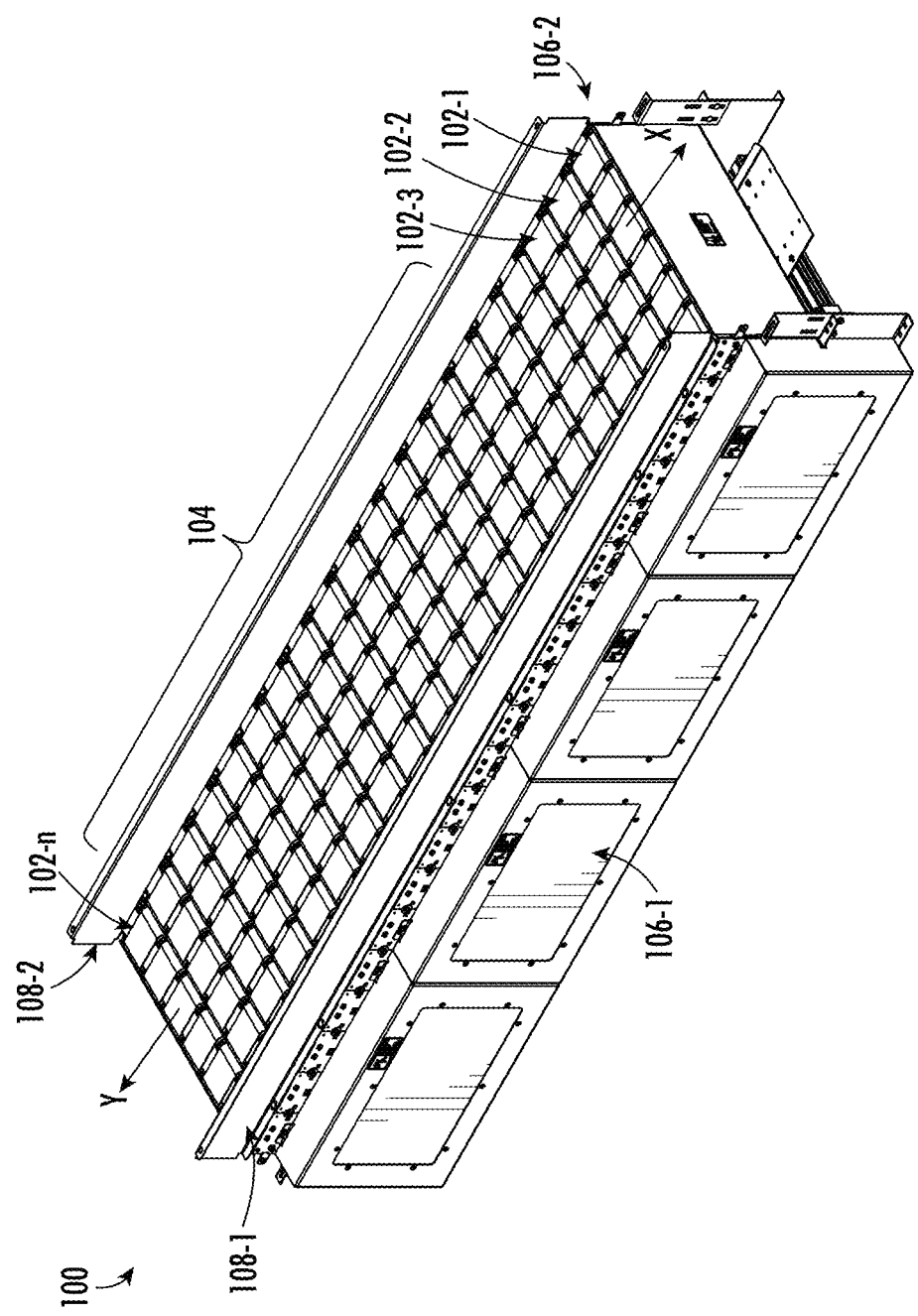
FIG. 1 illustrates a perspective view of a multi-belt conveyor comprising a plurality of cartridges, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

In material handling systems, usually, large quantities of items (such as boxes, parcels, packages, cartons, cases, containers, shipment boxes, totes, polybags, jiffy packages, and/or the like) or varying sizes can be inducted on a conveyor, as a disordered stream of items. It is often desired to create space or gapping between items, as the items are conveyed on the conveyor, in order to singulate individual items from the stream and further perform operations like, but not limited to, sorting. In such systems, it can be important to control a spacing, or gap, between a tail end of a leading item and a head end of a trailing item. Also, it may be desired to align product to a positional point like a pusher's leading edge for operation by the pusher. For instance, in some examples, if gaps created between the items are much bigger, throughput of conveying the items on the conveyor can be decreased, whereas, if the gaps between the items are too small, consecutive items may interfere with each other, that may cause jamming of items. To this extent, controlling these gaps can be especially difficult when the packages vary in size, shape, or orientation. Typically, multi-belt conveyors are used in such scenarios, where multiple conveyor belts are configured to move at varying speeds to cause creation of gaps between items as the items move along a conveyor bed. Multi-belt conveyors, usually, have complex design and maintenance and repairing operations on the multi-belt conveyors is challenging.

Typically, to maintain uptime and longevity of such multi-belt conveyors, occasional maintenance is required which results in, system downtime, loss of productivity, and a lot of manual efforts. Further, for such maintenance, operators generally have to do significant manual work which involves un-installing the multi-belt conveyor completely which may include, for example, un-fastening up a lot of components, or dismounting, or dismantling, components like, conveyor belts, conveyor frames, and/or the like. Further, in such multi-belt conveyors, it is desired, to maintain a flat and level conveying surface of the conveyor bed throughout the multi-belt conveyor. Maintenance involving mounting and un-mounting of complete conveyor frame along with associated components, as described before, often results in mis-alignment of conveyor belts defining the conveyor bed thereby. As a result, with frequent such operations of maintenance, the level conveying surface of the conveyor bed is disturbed, and bumps are created along a conveying surface of the conveyor bed over. Thus, in such cases, as the items are passed on the conveyor, a material handling system loses a track of items, as the items are conveyed on the conveyor bed.

Various example embodiments described herein, relates to a multi-belt conveyor for conveying items in a material handling environment. The multi-belt conveyor can comprise a conveyor bed defined by a plurality of cartridges positioned adjacently to each other. Each cartridge of the multi-belt conveyor can comprise: (a) a roller-slider bed defined by a set of rollers, where the roller-slider bed can operate as a roller bed and/or a slider bed, (b) an actuation assembly that can comprise a drive pulley that may be rotated about an axis, and (c) a set of conveyor belts mounted around the drive pulley and the roller-slider bed. The roller-slider bed can comprise a plurality of rollers so adjacently positioned to each there such that, the rollers define a roller bed. In accordance with said example embodiments, the roller-slider bed can be located slightly under a top elevation defined by the plurality of rollers so that each cartridge acts like a section of roller bed. In accordance with said example embodiments, a cartridge of the plurality of cartridges can be removably mounted on a base assembly of the multi-belt conveyor. Said differently, the cartridge can be removed from a base assembly of the multi-belt conveyor, without removing another cartridge which is positioned adjacent to the cartridge on the base assembly. In accordance with said example embodiments, the set of conveyor belts of the cartridge can be moved on the roller-slider bed at a defined speed in a direction of conveyance of items on the conveyor bed. In this regard, as the conveyor bed (or a conveying surface over which the items are conveyed) of the multi-belt conveyor is defined or can be formed by the placement of multiple cartridges adjacent to each other, sets of conveyor belts of respective cartridges may move at varying speeds along a direction of the conveyance. Said differently, a set of conveyor belts of each cartridge comprising conveyor belts along a width of the conveyor bed may move at a same speed, however, a speed at which the set of conveyor belts move may be different from a speed at which another set of conveyor belts for another (or adjacent) cartridge may move. In another embodiment, conveyor belts in a set of conveyor belt for a single cartridge may also move at different speeds relative to each other. Also, in some example embodiments, the sets of conveyor belts may operate at different acceleration and deacceleration rates. For example, in an embodiment, when items are positioned on a cartridge then an acceleration at which the set of conveyor belts of that cartridge may operate may be within a range from about 0.2 g (G-force) to about 0.5 g, or more specifically within a range from about 0.3 g to about 0.45 g or even more specifically at about 0.4 g. However, when the cartridge is empty (i.e. no item is being passed over the cartridge) then the set of conveyor belts of the cartridge may operate within a range of acceleration from about 1.5 g to about 2.2 g, or more specifically within a range from about 1.7 g to about 2.1 g, or even more specifically within a range from about 1.75 g to about 2 g.

Thus, multiple cartridges defined along a length of the conveyor bed may operate at varying speeds or acceleration or deacceleration, which can cause creation of programmed gaps between the items or to align the item at a desired position of the item relative to a target position of item moving at downstream speed on the conveyor, as the items are conveyed on the conveyor bed. In other embodiments, the speeds can also be varied in order to reduce a gap between items on the conveyor bed.

In accordance with said example embodiments described herein, the cartridge of the multi-belt conveyor is modular and can be mounted over a base assembly or dis-mounted from the base assembly of the multi-belt conveyor. In this regard, the cartridge can be mounted or un-mounted on the base assembly, without disturbing installation of an adjacent cartridge on the base assembly. In this regard, according to some example embodiments, mounting the cartridge over the base assembly can involve: (a) mating a cartridge frame base of the cartridge at a defined position over a portion of the base frame and (b) engaging the cartridge with the base frame by a nut and bolt assembly.

Further, in accordance with said example embodiments, the actuation assembly of the cartridge can be actuated by a timing belt which mechanically connects the drive pulley of the cartridge with a drive motor that may be installed at the base assembly of the multi-belt conveyor. In this regard, by actuation of the drive motor, the timing belt can move over a sprocket wheel of the actuation assembly to cause rotation of the drive pulley, which further causes movement of the set of conveyor belts over the roller-slider bed at a defined speed and/or acceleration. Further, details of the cartridge, mounting and dismounting of the cartridge with respect to base frame of the multi-belt conveyor are described hereinafter in reference to FIGS. 1-7.

FIG. 1 illustrates a perspective view of a multi-belt conveyor 100 comprising a plurality of cartridges 102-1, 102-2, 102-3 . . . 102-n, in accordance with some example embodiments described herein. The multi-belt conveyor 100 comprises, a conveyor bed 104 defined by the plurality of cartridges 102-1, 102-2, 102-3 . . . 102-n positioned adjacent to each other and covered at one side of the multi-belt conveyor 100 by respective timing belt covers 106-1, 106-2 . . . 106-a. respectively. As illustrated, the conveyor bed 104 extends along a length of the multi-belt conveyor 100. The conveyor bed 104 can comprise a conveying surface defined by plurality of conveyor belts of the plurality of cartridges 102-1, 102-2, 102-3 . . . 102-n onto which a stream of items can be conveyed. In some example embodiments, the conveyor bed 104 can be defined by an assembling of plurality of roller-slider beds of each cartridge where, each cartridge can constitute a respective roller-slider bed defined by a set of conveyor belts of that cartridge. Details of the set of conveyor belts and roller-slider bed defined by each cartridge are described later in reference to FIGS. 1-6. The multi-belt conveyor 100 can also comprise two side rails 108-1 and 108-2 at two ends (i.e. a left end and a right end) of the multi-belt conveyor 100. The side rails 108-1 and 108-2 may be mounted over the roller-slider beds (not shown) of the plurality of cartridges 102-1, 102-2, 102-3 . . . 102-n respectively. The side rails 108-1 and 108-2 can be installed over the conveyor bed 104 to prevent items to fall off, from the conveyor bed 104 during conveyance.

Illustratively, each cartridge of the plurality of cartridges 102-1, 102-2, 102-3 . . . 102-n comprises, sets of conveyor belts which can be configured to move in the upstream direction X or the downstream direction Y. In accordance with various example embodiments, the conveyor bed 104 may comprise a conveying surface which can be defined by the sets of conveyor belts of the plurality of cartridges 102-1, 102-2, 102-3 . . . 102-n. The conveying surface can facilitate conveyance of the stream of items positioned on the conveying surface. In this regard, the conveying surface defined by the sets of conveyor belts is a levelled conveying surface, that prevents any bumping, turning or mispositioning of the items, as the items are conveyed on the multi-belt conveyor 100. Further details related to movement of sets of conveyor belts for each cartridge of the plurality of cartridges 102-1, 102-2, 102-3 . . . 102-n is described later in reference to FIGS. 2-7.

According to various example embodiments, the multi-belt conveyor 100 illustrated in FIG. 1 may correspond to a conveyor of a sortation system (e.g. but not limited to, a section of loop sorter, or an induct conveyor, a conveyor for positioning an item aligned to a relative positional target moving on the conveyor, and/or the like).

In accordance with said example embodiments, each set of conveyor belts of respective cartridges 102-1, 102-2, 102-3 . . . 102-$n$, can be configured to move, in the directions X or Y depending on a direction (upstream or downstream) in which the items are to be conveyed. In this aspect, each set of conveyor belts of respective cartridges 102-1, 102-2, 102-3 . . . 102-$n$, can be configured to operate at varying speeds or acceleration or deacceleration, in response to actuation by a controller, such that, as the stream of items are conveyed on the conveyor bed 104, gaps or spacings that may be pre-programmed by the controller, can be created amongst different items. Said differently, in an example embodiment, conveyor belts of the cartridge 102-1 can move in a defined direction (e.g. the upstream direction X or the downstream direction Y) at a first speed which may be different than a second speed at which conveyor belts of the cartridge 102-2 can move, or at different acceleration rates, or different deacceleration rates, based on which (i) a gap or spacing can be created between two items, as the items move on the conveying surface of the conveyor bed 104 or (ii) an item can be positioned at a desired position (i.e. with respect to a trailing edge or leading edge) relative to another item on the conveyor bed 104.

In accordance with some example embodiments, drive motors of the multi-belt conveyor 100 may be installed on a left end or the right end of the multi-belt conveyor, depending on a material handling environment or installation site. For instance, in one example embodiment, the drive motors may be installed on the left-hand side, i.e. towards the side rail 108-1. In this regard, in order to cause movement of items in the upstream direction X, a drive motor towards an extreme left end (i.e. towards the cartridge 102-$n$) may be actuated first and thereafter subsequent drive motors may be actuated to rotate shafts of the respective motors in a clockwise direction to cause movement of sets of conveyor belts of the cartridges in direction X. Similarly, in order to cause movement of items in the direction Y, a drive motor towards an extreme right end (i.e. towards the cartridge 102-1) may be actuated first and thereafter subsequent drive motors may be actuated to rotate shafts of the respective motors in a counter-clockwise direction to cause movement of sets of conveyor belts of the cartridges in the direction Y.

In another example embodiment, drive motors of the multi-belt conveyor 100 may be installed on a right end of the multi-belt conveyor 100, i.e. towards the side rail 108-2. In this regard, to cause movement of items in the X direction, the drive motor of the extreme left end (i.e. towards the cartridge 102-$n$) can be actuated first and thereafter subsequent drive motors can be actuated to rotate shafts of the respective motors in a counter-counter-clockwise direction to cause movement of sets of conveyor belts of the cartridges in the direction X and so on.

Figure 2:
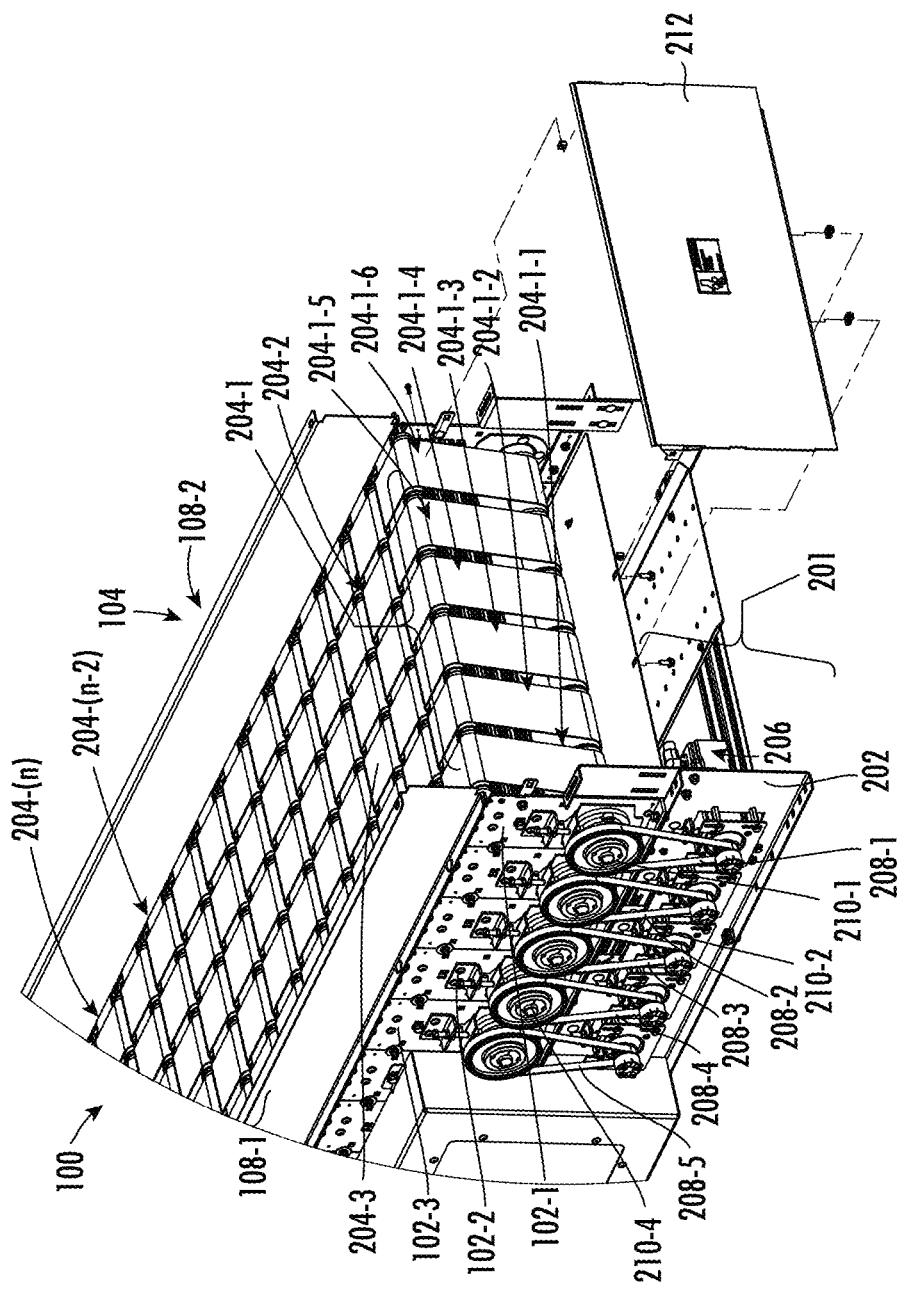
FIG. 2 illustrates another perspective view of the multi-belt conveyor depicting an assembly of the plurality of cartridges, in accordance with some example embodiments described herein.

FIG. 2 illustrates another perspective view of the multi-belt conveyor 100 depicting assembly of the plurality of cartridges 102-1, 102-2, 102-3 . . . 102-$n$, along a length of the multi-belt conveyor 100. In accordance with some example embodiments, the multi-belt conveyor 100 can be defined by two sections, viz. (i) the conveyor bed 104 comprising a plurality of cartridges 102-1, 102-2, 102-3, . . . 102-$n$ positioned adjacent to each other and (ii) a base assembly 201 that can comprise a base frame 202 over which the plurality of cartridges 102-1, 102-2, 102-3, . . . 102-$n$ can be mounted. As illustrated, each cartridge (102-1 or 102-2 . . . or 102-$n$) of the multi-belt conveyor 100 comprises sets of conveyor belts 204-1, 204-2 . . . 204-$n$, mounted over a roller-slider bed (not shown) and a drive pulley (not shown) of the respective cartridge. For instance, a cartridge 102-1 of the multi-belt conveyor 100 can comprise a set of conveyor belts 204-1, (i.e. conveyor belts 204-1-1, 204-1-2, 204-1-3, 204-1-4, 204-1-5, and 204-1-6). Similarly, a cartridge 102-2 can comprise a set of conveyor belts 204-2 (i.e. conveyor belts 204-2-1, 204-2-2, 204-2-3, 204-2-4, 204-2-5, 204-2-6), and so on. In this regard, the sets of conveyor belts 204-1, 204-2, 204-3 . . . 204-$n$ corresponding to the plurality of the cartridges 102-1, 102-2, 102-3, . . . 102-$n$ can be configured to operate at varying speeds or acceleration rate or deacceleration rate, to convey a stream of items (along with programmed creating gaps between items or positioning some items at a desired position relative to other items).

In accordance with said example embodiments, each set of the sets of conveyor belts 204-1, 204-2 . . . 204-$n$ can be actuated to move along the conveyor bed 104, by a corresponding drive motor 206 mounted on the base assembly 201 of the multi-belt conveyor 100. In this regard, in accordance with some example embodiments, the multi-belt conveyor 100 can comprise a plurality of drive motors 206-1, 206-2, 206-3 . . . 206-$n$ that can be mounted on the base assembly 201 of the multi-belt conveyor 100 (i.e. towards the right-hand side or the left-hand side of the multi-belt conveyor, as described before). In this regard, in some examples, a set of conveyor belts 204-2 corresponding to a second cartridge 102-2 may be moved by actuation by the drive motor 206-2 and a set of conveyor belts 204-3 corresponding to a third cartridge 102-3 may be moved by actuation by a drive motor 206-3, and so on. Said differently, in accordance with said example embodiments, a number of drive motors mounted on the base assembly 201 may correspond to a number of cartridges (or a number of sets of conveyor belts 204-1, 204-2, . . . 204-$n$) to be actuated for movement by the respective drive motor. Thus, in accordance with said example embodiments, drive motors of the multi-belt conveyor 100, can be configured to actuate and cause movement of a respective sets of conveyor belts 204-1, 204-2, 204-3 . . . 204-$n$ of the plurality of cartridges 102-1, 102-2, 102-3 . . . 102-$n$, details of which would be described later in reference to FIGS. 3-7.

According to some example embodiments, the movement of the sets of conveyor belts 204-1, 204-2 . . . 204-$n$ by the drive motors 206-1, 206-2 . . . 206-$n$ may be based on a mechanical coupling between pairs of the sets of conveyor belts and the drive motors (204-1, 206-1), (204-2, 206-2) . . . (204-$n$, 206-$n$) respectively, via actuation assemblies of each of the plurality of cartridges 102-1, 102-2 . . . 102-$n$.

According to some example embodiments, the multi-belt conveyor 100 can comprise a plurality of timing belts 208-1, 208-2, 208-3 . . . 208-$n$ which can mechanically couple sprockets 210-1, 210-2 . . . 210-$n$ of each of the plurality of cartridges 102-1, 102-2, 102-3 . . . 102-$n$ to the plurality of drive motors 206-1, 206-2, 206-3 . . . 206-$n$ that may be respectively mounted on the base assembly 201. Thus, in an example operation, the plurality of drive motors 206-1, 206-2, 206-3 . . . 206-$n$ can actuate to cause rotation of its respective shaft that drives a movement of the plurality of timing belts 208-1, 208-2, 208-3 . . . 208-$n$ over the sprocket wheels 210-1, 210-2 . . . 210-$n$, in clockwise or counter-clockwise direction. Rotation of the sprocket wheels 210-1, 210-2 . . . 210-$n$, causes rotation of a drive pulley of the cartridges which causes movement of the sets of conveyor belts 204-1, 204-2 . . . 204-$n$ of respective cartridges. Further details of: (i) mechanical coupling between the drive motors 206-1, 206-2 . . . 206-n and the sets of conveyor belts 204-1, 204-2 . . . 204-n, via actuation assemblies and (ii) the actuation by the drive motor to cause movement of the sets of conveyor belts 204-1, 204-2 . . . 204-n, are described in reference to FIGS. 4-7.

Illustratively, the multi-belt conveyor 100 also comprises an end cover 212 which can be mounted between the two cartridge frame tops 304 of each cartridge and a bottom cover 213 to block access to components, upon assembling the plurality of cartridges 102-1, 102-2, 102-3 . . . 102-n of the multi-belt conveyor 100.

Figure 3:
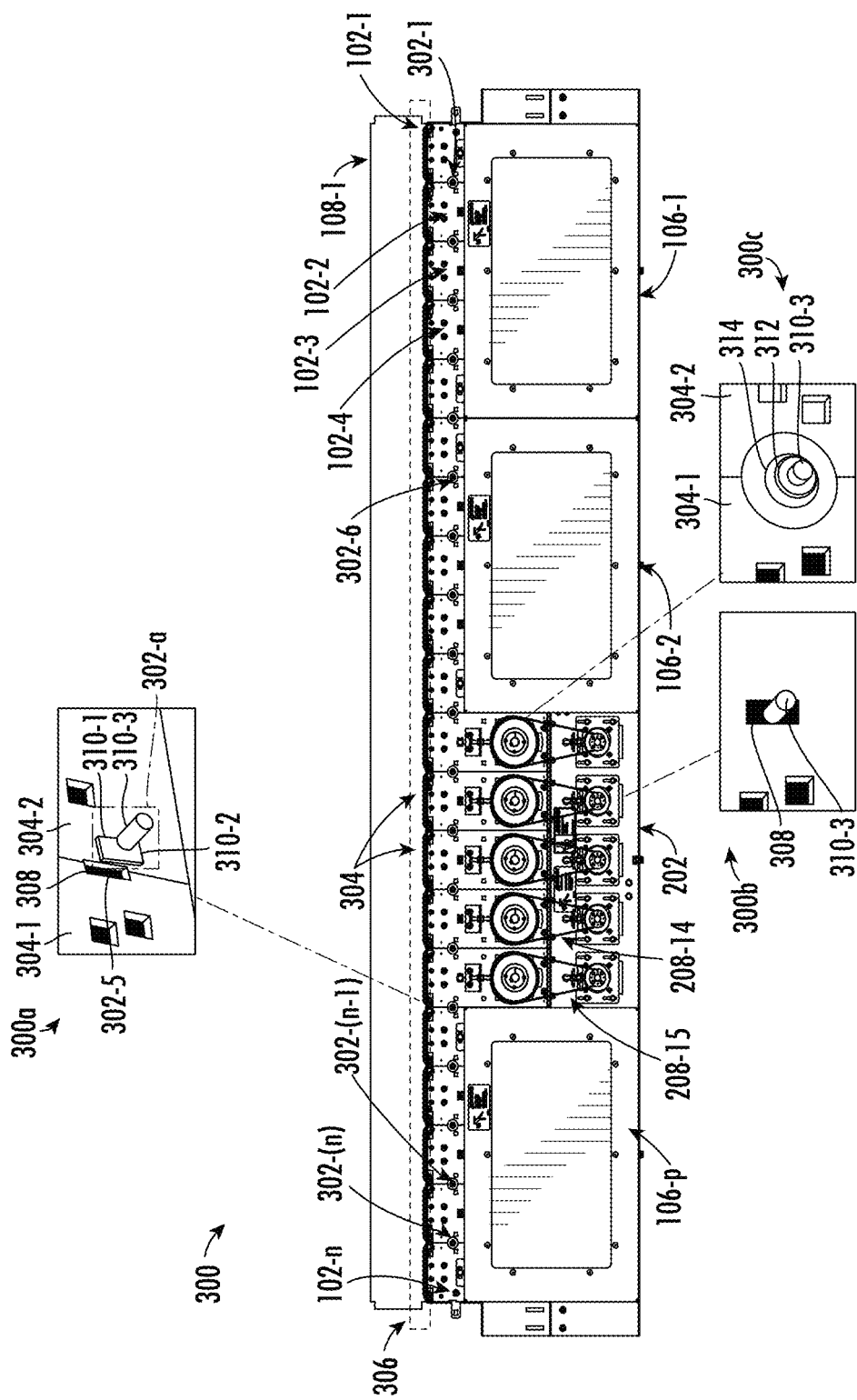
FIG. 3 illustrates a side view of the multi-belt conveyor comprising the plurality of cartridges disposed adjacently to each other, in accordance with some example embodiments described herein.

FIG. 3 illustrates a side view 300 of the multi-belt conveyor 100 comprising the plurality of cartridges 102-1, 102-2, 102-3 . . . 102-n, in accordance with various example embodiments described herein. Although, a section of the multi-belt conveyor 100 depicted in the side view 300 of FIG. 3 comprises 20 cartridges adjacently positioned to each other. However, without limiting a scope of present disclosure, in accordance with various example embodiments, the multi-belt conveyor 100 may comprise any number of cartridges that can be removably positioned adjacently to each other which can define the conveyor bed 104 for conveying a stream of items. As shown, the multi-belt conveyor 100 can also comprise a plurality of T-bolts 302-1, 302-2 . . . 302-n. The T-bolts 302-1, 302-2 . . . 302-n can be configured to engage cartridge frame tops 304 of two adjacently positioned cartridges. For instance, a T bolt-302-1 can engage cartridge frame tops of cartridges 102-1 and 102-2 respectively. In this regard, in accordance with said example embodiments, the T-bolt-302-1 can be inserted in a slot formed by cartridge frame tops 304 of two adjacently positioned cartridges 102-1 and 102-2 thereby, making a contact with two adjacent cartridges 102-1 and 102-2. Further, upon inserting the T-bolt 302-1 between the two adjacently positioned cartridges 102-1 and 102-2, a nut and washer can be fastened from the outside, over an end of the T-bolt 302-1. Accordingly, the cartridge frame tops 304 of the two adjacently positioned cartridges 102-1 and 102-2, respectively, can be pulled flush and arranged collinear to each other, allowing for a seamless integration on of the cartridges 102-1 and 102-2 on a horizontal plane defined by a top flange 410 of a channel of top flange 410 the base frame 202. Accordingly, for disengaging or un-mounting a cartridge from the base frame 202, a respective T-bolt engaging the cartridge with an adjacent cartridge can be removed and thereafter the cartridge frame base 408 can be disengaged from the base frame 202.

Referring to FIG. 3, enlarged views 300a, 300b, 300c, depicts assembling of T-bolts 302-n between the adjacently positioned cartridges 102-1, 102-2 . . . 102-n thereby engaging cartridge frame tops 304 of respective cartridges. Illustratively, each cartridge frame top 304 of the respective cartridges 102-1, 102-2 . . . 102-n, comprises an aperture which defines a half of a slot 308 (defined upon assembling adjacent cartridges) into which a respective T-bolt 302-n can be inserted. For example, referring to view 300a, cartridge frame top 304-1 and cartridge frame top 304-2 of adjacently positioned cartridges defines the slot 308 into which a T bolt 302-a can be inserted. The T-bolt 302-a can comprise a first end 310-1, a second end 310-2, and a third end 310-3. Further, in some example embodiments, preassembled T-bolt assemblies comprising, the T-Bolt 302-a, a nut 312, and a washer 314, can be used for engaging cartridge frame tops 304 of adjacently positioned cartridges. Referring to the view 300b, the T-bolt 302-a can be inserted into the slot 308 like a key and the bolt assembly is rotated until the 90° and a cam stop 311 defined on a bottom of the T-bolt towards the first end 310-1 hits an edge of the slot 308. In this regard, referring to the view 300c, the nut 312 can be tightened over the third end 310-3 of the T-bolt 302-a, to clamp each cartridge frame top 304 of adjacently positioned cartridges, between a T head defined by the first end 310-1 and the second end 310-2 of the T-bolt 302-a, and washer face of the washer 314, thereby aligning the cartridge frame tops 304 (e.g. 304-1 and 304-2) of adjacently positioned cartridges. Further, in accordance with said example embodiments, to remove the T bolt 302-a, the nut 312 can be loosened and upon loosening the nut 312, the T-bolt 302-a can be rotated 90° so the bolt assembly can be removed from the slot 308 together.

Further, in accordance with said example embodiments, the multi-belt conveyor 100 can comprise timing belt covers 106-1, 106-2 . . . 106-p to cover the plurality of cartridges 102-1, 102-2, 102-3 . . . 102-n mounted over the base frame 202. The timing belt covers 106-1, 106-2 . . . 106-p can prevent deposition of dust or unwanted dirt on the cartridges, as well as, provide additional safety of the multi-belt conveyor 100 by preventing access to components of the conveyor in operation.

In accordance with various example embodiments, the plurality of cartridges 102-1, 102-2, 102-3 . . . 102-n can be mounted over the base assembly 201 of the multi-belt conveyor 100 such that, a conveying surface 306 formed by assembling of the sets of conveyor belts 204-1, 204-2 . . . 204-n has consistent levelling throughout along a length of the multi-belt conveyor 100. Levelled conveying surface 306 can be achieved due to controlling of a distance from the cartridge frame base 408 to the conveying surface 306. In this regard, the levelled conveying surface 306 is formed due to various factors, for example, but not limited to, (a) a spring pin and nut & bolt assembly based fixed engagement of cartridge frame top (having a tight tolerance) of the cartridge with a cartridge frame base of the cartridge, (b) engagement of the cartridge frame base on a top flange defined by a channel of the base frame, (c) positioning of rollers of the roller-slider bed of each cartridge on a machined cross-member and (d) engagement of the machined cross-member with the cartridge frame top, details of which are described at various instances hereinafter in reference to description of FIGS. 4-6. It may be understood that, levelled and consistent conveying surface prevents formation of any bumps or uneven surfaces on the conveyor bed 104. In this regard, in accordance with various example embodiments described herein, when the plurality of cartridges 102-1, 102-2, 102-3 . . . 102-n are mounted on the base frame 202, a set of conveyor belts of each cartridge is co-planar with a set of conveyor belts of an adjacently positioned cartridge. For instance, according to said examples, upon mounting cartridge 102-1 and cartridge 102-2 on the base frame 202, a set of conveyor belts 204-1 of the cartridge 102-1 defines a portion of the conveying surface 306 which is co-planar with another portion of the conveying surface 306 defined by set of conveyor belts 204-2 of the cartridge 102-2.

Figure 4:
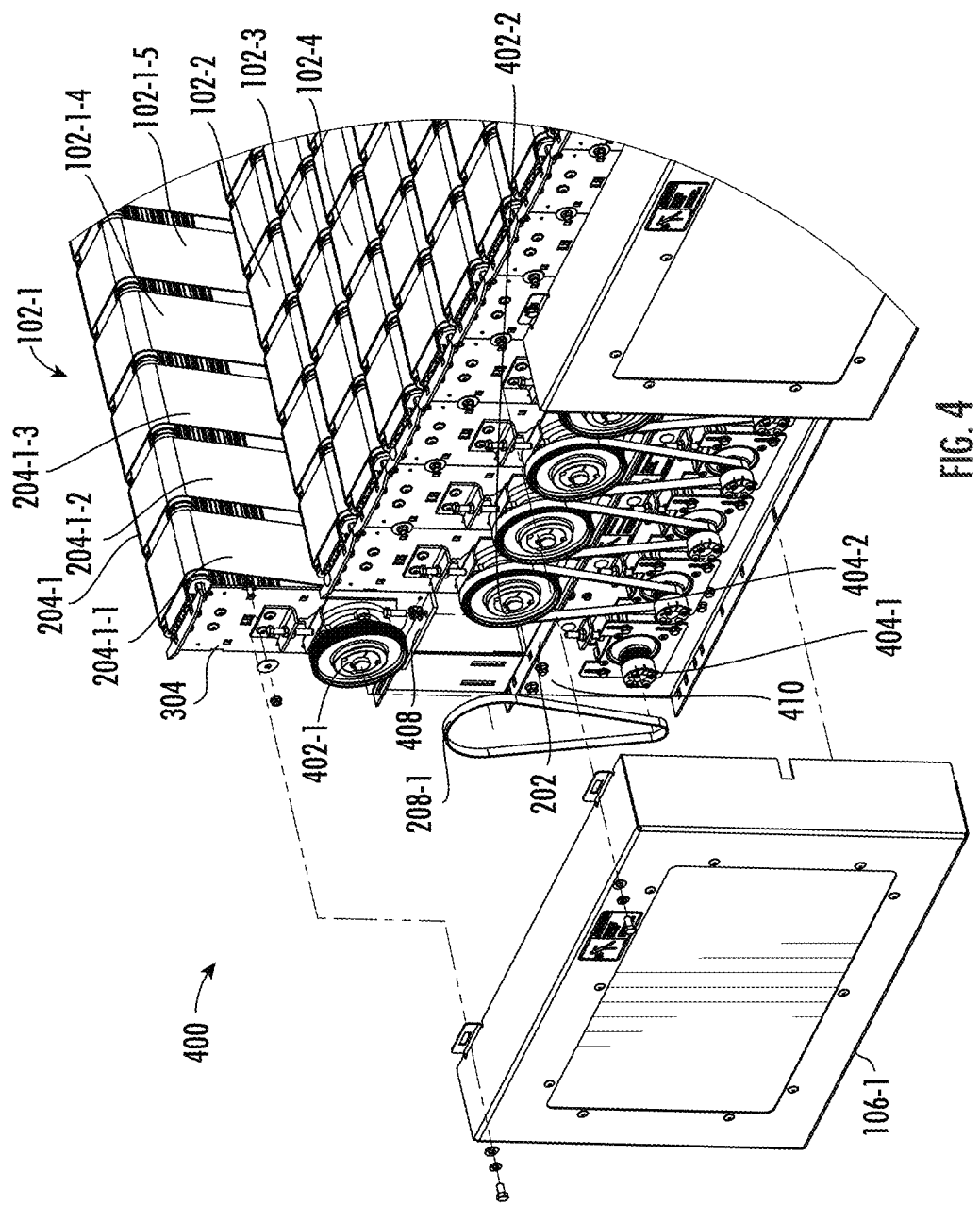
FIG. 4 illustrates a sectional view of the multi-belt conveyor depicting a cartridge of the plurality of cartridges un-mounted from a base assembly of the multi-belt conveyor, in accordance with some example embodiments described herein.

FIG. 4 illustrates a sectional view 400 of the multi-belt conveyor 100 depicting a cartridge 102-1 of the plurality of cartridges 102-1, 102-2, 102-3 . . . 102-n, un-mounted from the base assembly 201 of the multi-belt conveyor 100, in accordance with some example embodiments described herein. As shown, the cartridge 102-1 can be un-mounted from the base frame 202 of the multi-belt conveyor 100. In this regard, in accordance with various example embodiments described herein, the cartridge 102-1 can be unmounted from the base frame 202 without removing an adjacent cartridge 102-2 from the plurality of cartridges 102-1, 102-2, 102-3 . . . 102-n of the multi-belt conveyor 100.

In accordance with various example embodiments described herein, the cartridge 102 comprises the set of conveyor belts 204 (comprising conveyor belts 204-1-1, 204-1-2, 204-1-3, 204-1-4, 204-1-5, and so on), which can be mounted over a roller-slider bed and a drive pulley of the cartridge 102-1. Details related to mounting of set of conveyor belts 204 and components of the roller-slider bed are described in reference to FIG. 6.

Referring back to FIG. 4, each cartridge of the plurality of cartridges 102-1, 102-2, 102-3 . . . 102-n can comprise a cartridge frame top 304 and a cartridge frame base 408. The cartridge frame base 408 can be defined at an angle relative to the cartridge frame top 304. For instance, in some examples, the cartridge frame base 408 of the cartridge 102-1 can engaged with the cartridge frame top 304 such that, the cartridge frame base 408 defines an angle almost perpendicular to the cartridge frame top 304. In this aspect, in accordance with various example embodiments described herein, the cartridge base frame 408 can be fixedly engaged to the cartridge frame top 304, by a spring pin and a nut and bolt assembly, so that a pivotal movement or a relative movement between the cartridge frame top 304 and the cartridge frame base 408 may be avoided. In accordance with said example embodiment, the spring pin can locate the cartridge frame top 304 relative to a base angle defined between the cartridge frame top 304, the cartridge frame base 408, and the top flange 410 of the base frame 202, such that all features are positioned and located with minimal tolerance variation to maximize assembly repeatability, thereby allowing for a flat top conveying surface, and eliminating planar variation amongst sections of conveying surface defined by adjacently positioned cartridges. Further details of engagement of the cartridge frame top 304 and the cartridge frame base 408, are described later in reference to FIGS. 5 and 6.

In accordance with various example embodiments described herein, the plurality of cartridges 102-1, 102-2, 102-3 . . . 102-n can be mounted or un-mounted, from the base frame 202 based on engagement or disengagement, of the cartridge frame base 408 (of the respective cartridge) with an top flange 410 defined on the base frame 202. In this regard, in some examples, a shape of the cartridge frame base 408 of the plurality of cartridges 102-1, 102-2, 102-3 . . . 102-n is such that, it complements a shape of the top flange 410 of the base frame 202. Said differently, for mounting the cartridge 102-1 to the base frame 202, the cartridge 102-1 can be positioned over the base assembly 201 such that, the cartridge frame base 408 is positioned in a desired orientation over a portion of the top flange 410 of the base frame 202. For example, in some embodiments, for mounting the cartridge 102 on the base frame 202, the cartridge frame base 408 can be positioned over the top flange 410 of the base frame 202 such that an aperture defined on the cartridge frame base 408 overlaps with another aperture defined on the top flange 410 of the base frame 202. In this regard, upon aligning the apertures, an engagement pin or a bolt can be passed through both the respective apertures on the cartridge frame top 304 and the cartridge frame base 408, and fastened with a bolt, to engage the cartridge 102-1 on the base frame 202. By mating the cartridge frame base 408 over the top flange 410 of the base frame 202, in a manner as described, a precision fit coupling of the cartridge frame base 408 with the base frame 202, via a nut and bolt assembly, can be achieved. This prevents any sideways or lateral movement of the cartridge frame base 408 about the base frame 202 during a conveying operation of the multi-belt conveyor 100. Thus, based on the precision fit coupling, the cartridge 102-1 can be fixedly mounted on the base assembly 201. Also, as each cartridge of the plurality of cartridges 102-1, 102-2, 102-3 . . . 102-n can be mounted on the base frame 202 by engagement of the cartridge frame base 408 and top flange 410, the conveying surface 306 formed by the plurality of cartridges 102-1, 102-2, 102-3 . . . 102-n is always at a defined height (and without any un-evening) relative to the base frame 202. In other words, when the plurality of the cartridges 102-1, 102-2, 102-3 . . . 102-n are mounted on the base frame 202, the set of conveyor belts 204-1, 204-2 . . . 204-n (in an assembled version of the multi-belt conveyor 100) are always co-planar to each other. Thus, in accordance with said example embodiments described herein, based on the precision fit coupling and cartridge assembly tolerancing and positioning that can be achieved through use of the spring pin as a locating and constraining entity, even upon repeatable un-mounting and subsequent mounting of different cartridges on the base frame 202, a level conveying surface can be achieved for conveying the items.

Figure 5:
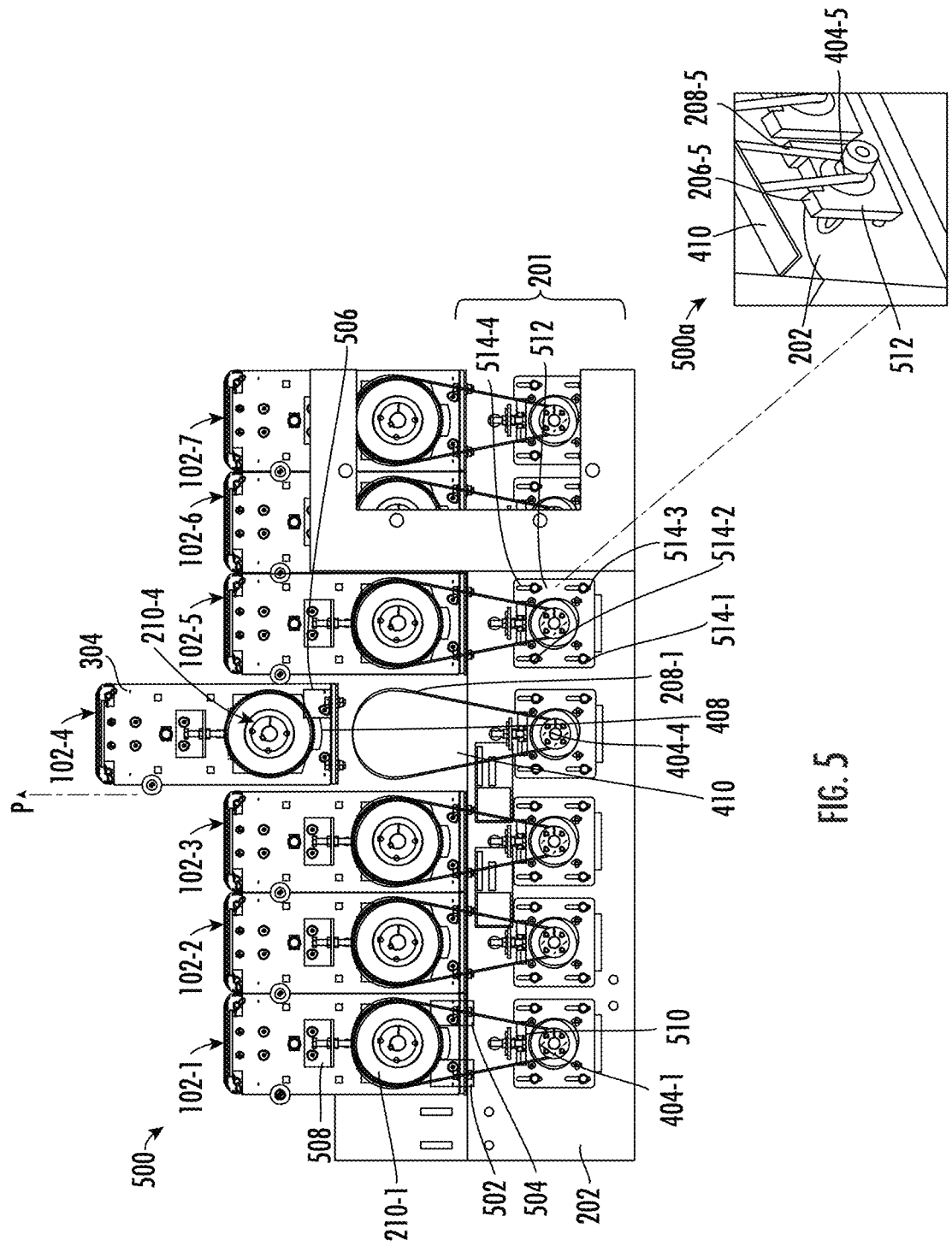
FIG. 5 illustrates a side view of the multi-belt conveyor depicting a cartridge of the plurality of cartridges un-mounted from a base assembly of the multi-belt conveyor, in accordance with some example embodiments described herein.

FIG. 5 illustrates, a front sectional view 500 of the multi-belt conveyor 100 comprising the plurality of cartridges 102-1, 102-2 . . . 102-n and depicting a cartridge 102-4 un-mounted from the base assembly 201 of the multi-belt conveyor 100, in accordance with some example embodiments described herein. Illustratively, cartridges 102-1, 102-2, 102-3, 102-5, 102-6, and 102-7 of the multi-belt conveyor 100 are mounted on the base frame 202 of the base assembly 201 and cartridge 102-4 is un-mounted from the base assembly 201. In accordance with various example embodiments described herein, each cartridge of the cartridges 102-1, 102-2, 102-3, 102-5, 102-6, and 102-7 can be mounted on the base frame 202 by an engagement of a cartridge frame base 408 of the cartridge to the top flange 410 defined by the base frame 202, via a respective nut and bolt assembly. Illustratively, the cartridge 102-1 can be mounted on the base frame 202, via two nut and bolt assemblies 502 and 504.

In accordance with said example embodiments, each cartridge of the cartridges 102-1, 102-2, 102-3, 102-4, 102-5, 102-6, and 102-7 can comprise: the cartridge frame top 304 and the cartridge frame base 408, where the cartridge frame base 408 can be fixedly engaged to the cartridge frame top 304, via an engagement unit 506. The engagement unit 506 can comprise a spring pin and a nut and bolt assembly. In this regard, for engaging the cartridge frame top 304 with the cartridge frame base 408, the spring pin can be through passed from one end of the cartridge frame top 304 into an aperture on the cartridge frame base 408, thereby aligning the cartridge frame top 304 with the cartridge frame base 408, and subsequently the cartridge frame top 304 can be engaged with the cartridge frame base 408, via fastening of the nut and bolt assembly, as described earlier in reference to FIG. 4.

In accordance with said example embodiments, the cartridge 102-4 can be un-mounted from the base frame 202 by removing T-bolts between the cartridges 102-3 and 102-4 and between the cartridges 102-4 and 102-5, and further disengaging, an engagement of the cartridge frame base 408 of the cartridge 102-4 with the top flange 410 of the base frame 202 via the nut and bolt assembly (similar to the nut and bolt assemblies 502 and 504). In this regard, upon disengagement, a timing belt 208-1 connecting the sprocket 210-4 of the cartridge 102-4 and a sprocket 404-2 comprising a bushing at the base assembly 201 can be removed and subsequently, the cartridge 102-4 can be lifted upwards in a direction P. According to various example embodiments described herein, the cartridge 102-4 can be removed or un-mounted from the base assembly 201 of the multi-belt conveyor 100 without removing an adjacent cartridge (i.e. cartridge 102-3 and 102-5) of the multi-belt conveyor 100. Further details including steps for mounting and un-mounting a cartridge of the plurality of cartridges 102-1, 102-2 ... 102-n from the base assembly 201 of the multi-belt conveyor 100 are described in reference to FIG. 7.

Referring to FIG. 5, each cartridge of the plurality of cartridges 102-1, 102-2 ... 102-n comprises, a conveyor belt tensioning unit 508 that can be configured to manipulate a tension of the set of conveyor belts 204-1, 204-2 ... 204-n which are mounted around roller-slider bed and a drive pulley of each cartridge, to be a desired value. Further, the base assembly 201 of the multi-belt conveyor 100 comprises a plurality of timing belt tensioning units 510 that can be configured to manipulate tension of each of respective timing belts 208-1, 208-2 ... 208-n mounted around the sprocket wheels 210-1, 210-2 ... 210-n, of the cartridges and the sprockets with bushings, i.e. sprockets 404-1, 404-2 ... 404-n, on the base assembly 201. Illustratively, the base assembly 201 can comprise the plurality of drive motors 206-1, 206-2 ... 206-n that can be configured for driving a movement of the set of conveyor belts 204-1, 204-2 ... 204-n of respective cartridges.

In accordance with said example embodiments, each drive motor can be mounted from a back surface (not shown) of a tensioning plate 512 which can be then bolted to a front facing surface of the base frame 202 using 4 attaching front facing bolts, 514-1, 514-2, 514-3, and 514-4 and respective coupling nuts. In this regard, the base frame 202 can define an opening so that the drive motors 206-1, 206-2 ... 206-n, can be situated within the base frame 202 but still remain adjustable from the outside. For instance, an enlarged view 500a depicts assembling of a drive motor 206-5 on the base assembly 201. Illustratively, the drive motor 206-5 is mounted on a back surface of the tensioning plate 512 to form an assembly (i.e. a drive motor mounted on the tensioning plate) such that the drive motor 206-5 can move along the assembly through an aperture defined in the base frame 202. In accordance with said example embodiments, the assembly (i.e. the drive motor 206-1 mounted on the tensioning plate 512) can be mounted on the base frame 202, via the coupler nut spacers, i.e. the front facing bolts 514-1, 514-2, 514-3, and 514-4 and respective nuts which can be fastened over the respective bolts to engage the assembly on the base frame 202.

In accordance with said example embodiments, each drive motor may comprise a respective shaft which may be through passed along with the assembly of the drive motor mounted on the tensioning plate, from the back surface of the base frame 202 to the front surface. The shafts of the drive motors 206-1, 206-2, ... 206-n can be mechanically coupled to respective sprockets having bushings, i.e. the sprockets 404-1, 404-2 ... 404-n. In accordance with said example embodiments, to tighten tension of the timing belt 208-1, front facing bolts 514-1, 514-2, 514-3, and 514-4 of the tensioning plate 512 can be tightened upon mounting the assembly of the drive motor 206-1 and the tensioning plate 512 on the base frame 202 such that, the drive motor 206-1 can be pushed in a downward direction to a desired location on the base frame 202, thereby stretching the timing belt 208-1, until the correct and intended tension is achieved.

In some example embodiments, to ensure that a tension of the timing belts 208-1, 208-2, ... 208-n is at a desired value and the drive pulley 602 is levelled correctly on both left and right ends of the multi-belt conveyor 100, the cartridges 102-1, 102-2, ... 102-n and/or the base frame 202 may include a provision (e.g. an aperture or opening or a defined shape) that allows a feeler gauge for measuring a position of the drive pulley 602 relative to the top flange 410 of the base frame 202.

Figure 6:
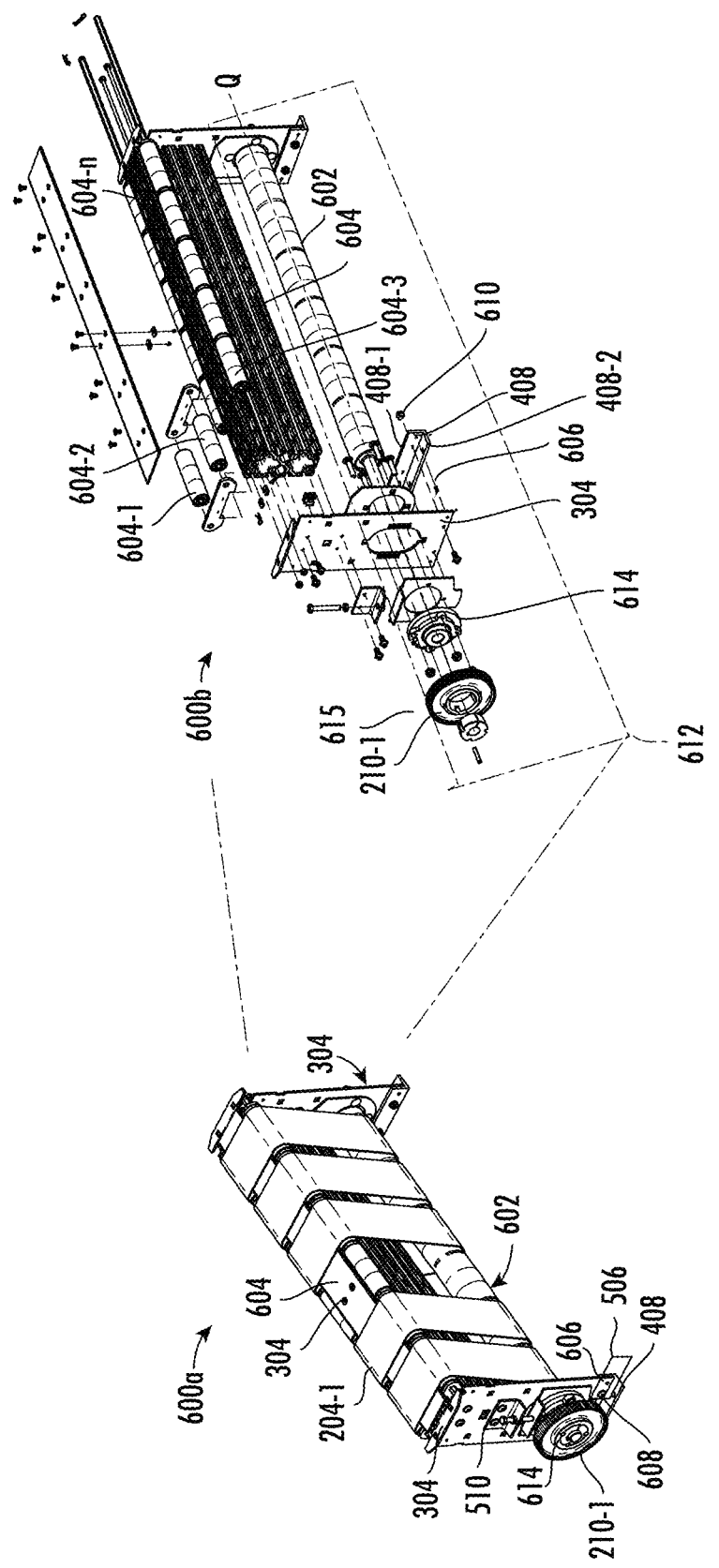
FIG. 6 illustrates a perspective view and an exploded view of a cartridge, in accordance with some example embodiments described herein.

FIG. 6 illustrates a perspective view 600a and an exploded view 600b of the cartridge 102-1 of the plurality of cartridges 102-1, 102-2, 102-3 ... 102-n of the multi-belt conveyor 100, in accordance with some example embodiments described herein. The cartridge 102-1 comprises: a drive pulley 602 rotatable about an axis Q, a roller-slider bed 604 (that can comprise a plurality of rollers 604-1, 604-2, 604-3 ... 604-n), and the set of conveyor belts 204-1 (i.e. conveyor belts 204-1-1, 204-1-2 ... and 204-1-6) As illustrated, in the perspective view 600a, the set of conveyor belts 204-1 can be mounted around the drive pulley 602, a portion 304-3 of the cartridge frame top 304, and the roller-slider bed 604. Illustratively, the cartridge 102-1 can comprise the cartridge frame top 304 and the cartridge frame base 408, enclosing the drive pulley 602 and the roller-slider bed 604 of the cartridge 102-1. In some example embodiments, the cartridge frame base 408 can have a shape of a bracket comprising two surfaces that meets at a defined angle (for example, at 90 degrees), where a first surface 408-1 of the cartridge frame base 408 can mate over a back portion of the cartridge frame top 304 and a second surface 408-2 of the cartridge frame base 408 can engage with the base frame 202 via apertures defined on the second surface 408-2 of the cartridge frame base 408. In this regard, as described earlier, the cartridge frame base 408 can be fixedly engaged with the cartridge frame top 304 by the engagement unit 506. In some examples, the engagement unit 506 can comprise: a spring pin 606 and a nut and bolt assembly including a bolt 608 and a nut 610. In accordance with various example embodiments described herein, for engaging the cartridge frame top 304 with the cartridge frame base 408, the first surface 408-1 of the cartridge frame base 408 can be aligned over the back portion of the cartridge frame top 304, so that the spring pin 606 can pass through apertures defined on respective surfaces of the cartridge frame top 304 and the cartridge frame base 408, thereby aligning the two frames. Further, upon alignment, the bolt 608 can be passed through apertures of the cartridge frame top 304 and the cartridge frame base 408 and the nut 610 can be fastened over the bolt 608 to fixedly engage the cartridge frame top 304 with the cartridge frame base 408.

In accordance with various example embodiments described herein, each cartridge of the plurality of cartridges 102-1, 102-2, 102-3 ... 102-n can comprise an actuation assembly 612 that can be configured for actuating a movement of the set of conveyor belts 204-1 over the roller-slider bed 604 of the respective cartridge, by rotation of the drive pulley 602 and rollers 604-1, 604-2 ... 604-n of the roller-slider bed 604. Illustratively, the actuation assembly 612 can comprise: the sprocket wheel 210-1 that can be mechanically received over a flange mount ball bearing 614. In accordance with said example embodiments, a shaft of the drive pulley 602 can through pass the cartridge frame top 304 and can be mechanically coupled to the flange mount ball bearing 614. In this regard, the sprocket wheel 210-1 can define, a circular surface 615 over which the timing belt 208-1 can positioned and mounted at a first end around the sprocket wheel 210-1. Further, at a second end, the timing belt 208-1 can be mounted around the sprocket 404-1 of the base assembly 201. In this regard, movement of the timing belt 208-1 over the sprocket wheel 210-1 causes rotation of the sprocket wheel 210-1, in clockwise or counterclockwise direction. As the sprocket wheel 210-1 rotates, the flange mount ball bearing 614 and the shaft of the drive pulley 602 follows the rotation of the sprocket wheel 210-1, thereby causing movement of the set of conveyor belts 204-1 over the roller-slider bed 604.

Illustratively, the cartridge 102-1 also comprises the conveyor belt tensioning unit 508 comprising a tensioning bolt 624, a tensioning bracket 626, and a tensioning plate 628. In an assembled version of the cartridge 102-1 (as shown in the perspective view 600a), a position at which the tensioning plate 628 can be mounted on the cartridge frame top 304 can be adjusted by tightening or loosing the tensioning bolt 624, which also adjusts a position at which the actuation assembly 612 of the cartridge 102-1 is mounted on the cartridge frame top 304. Accordingly, by manipulating the position at which the actuation assembly 612 can be mounted on the cartridge frame top 304, a tension of the set of conveyor belts 204-1 of the cartridge 102-1 can be adjusted.

In accordance with said example embodiments, each cartridge of the plurality of cartridges 102-1, 102-2 . . . 102-n can also include a machined cross member 616 comprising grooves 616-1 that supports precision fit engagement of some components like the rollers 604-1, 604-2 . . . 604-n) of the cartridge to control a position of the conveying surface of the cartridge to the cartridge base frame 408. Referring to enlarged view 600c of the machined cross member 616 can be configured to engage with the cartridge frame top 304 based on a spring pin and nut and bolt coupling 620 based arrangement, (in a similar fashion, as described before for the spring pin 606 and a nut and bolt assembly including a bolt 608 and a nut 610 for engagement of the cartridge frame top 304 with the cartridge frame base 408) to enable precision fit engagement of the machined cross member 616 with the cartridge frame top 304. In some example embodiments, a nut and bolt assembly can be used for engaging the cartridge frame top 304 with the machined cross member 616 without using the spring pin. In this aspect, the cartridge frame top 304 can comprise one or more apertures 618 through which the nut and spring pin of the spring pin and nut and bolt coupling 620 through passes for the engagement with apertures 616-2 on the machined cross member 616. Further, in accordance with said example embodiments, the grooves 616-1 of the machined cross member 616 can also be configured to support positioning of the rollers 604-1, 604-2, 604-3 . . . 604-n at various positions relative to a top plate 622 of the cartridge frame top 304 around which the set of conveyor belts 204-1, 204-2 . . . 204-n can be mounted. For instance, referring to view 600d, the machined cross member 616 comprises grooves 616-1 that can be configured to support roller support flats 622 which support the positioning of the rollers 604-1, 604-2, 604-3 . . . 604-n. In accordance with said example embodiments, the rollers 604-1, 604-2, . . . 604-n, can be supported over the machined cross member 616 thereby, (i) adjusting a positioning of the conveying surface relative to the cartridge frame base 408 and (ii) locating tight tolerance roller support flats and the top plate 622 around which the set of conveyor belts 204-1, 204-2 . . . 204-n are mounted thereby defining the roller-slider bed 604. Thus, the machined cross member 616 supports controlling of a level conveying surface of the roller-slider bed 604 based on at least, (a) supporting positioning of the rollers 604-1, 604-2 . . . 604-n at various positions and (b) fixedly engaging the components (like the cartridge frame top 304, the top plate 622, and/or the like) together, thereby preventing any loose coupling.

FIG. 7 illustrates a flowchart representing a method 700 for mounting the cartridge 102-1 on the base assembly 201 of the multi-belt conveyor 100, in accordance with some example embodiments described herein. At step 702, the method comprises, positioning, the cartridge 102-1 over the base frame 202 of the multi-belt conveyor 100. As shown in FIG. 6, the cartridge 102-1 comprises: the roller-slider bed 604 comprising a plurality of rollers 604-1, 604-2 . . . 604-n, the drive pulley 602 configured to be rotated about the axis Q, and the set of conveyor belts 204-1 mounted around the roller-slider bed 604 and the drive pulley 602. The set of conveyor belts 204-1, referred herein, are configured to move over the roller-slider bed 604 in response to rotation of the drive pulley 602 and the plurality of rollers 604-1, 604-2 . . . 604-n. In some example embodiments, the cartridge 102-1 can be positioned over the base assembly 201 in such a manner, that the cartridge frame base 408 is positioned over the top flange 410 of the base frame 202 in a defined orientation. For instance, in some examples, the cartridge 102-1 can be positioned over the base assembly 201 such that, apertures defined on the cartridge frame base 408 mates with apertures defined on the top flange 410 of the base frame 202.

Moving to step 704, the cartridge 102-1 can be mounted over the base frame 202 of the multi-belt conveyor 100 by an engagement of the cartridge frame base 408 with a section (for example, the top flange 410) of the base frame 202. In this regard, as described at step 702, upon aligning apertures defined on the cartridge frame base 408 and the top flange 410, a bolt can be passed through both the apertures and a nut can be fastened over threadings of the bolt, to engage the cartridge frame base 408 with the base frame 202, in a similar manner as described in FIGS. 4-6. Further, in some example embodiments, upon mounting the cartridge 10-2-1 over the base frame 202, T-bolt 302-1 can be keyed into the slot 308, as described in FIG. 3, to engage the cartridge frame top 304-1 of the cartridge 102-1 with the cartridge frame top 304-2 of the cartridge 102-2 that may be already mounted on the base frame 202.

Moving to step 706, upon mounting the cartridge 102-1 over the base frame 202, the method comprises, installing the timing belt 208-1 between the cartridge 102-1 and the base assembly 201 of the multi-belt conveyor 100. The timing belt 208-1 can mechanically couple the drive pulley 602 of the cartridge 102-1 to a shaft of the drive motor 206-1. In this regard, in accordance with said example embodiments, the timing belt 208-1 can be mounted around the sprocket wheel 210-1 of the cartridge 102-1 and the sprocket 404-1 of the base assembly 201, as described in reference to FIGS. 4-6.

In an example embodiment, a method for un-mounting the cartridge 102-1 mounted on the base frame 202 of the multi-belt conveyor 100 can comprise (a) removing, T-bolt engaged between cartridge frame tops of the cartridge and another cartridge adjacently positioned to the cartridge. The method can further comprise: (b) loosening the front facing bolts 514-1, 514-2, 514-3, and 514-4 to so that the tensioning plate 512 can slide freely, thereby changing a height at which the drive motor 206-1 is positioned on the base frame 202. The method can further comprise (c) loosening, by the timing belt tensioning unit 510, a tension of the timing belt 208-1 mounted around the sprocket wheel 210-1 of the cartridge 102-1 and the sprocket 404-1 comprising a bushing mechanically coupled to the drive motor 206-1. The method can further comprise (d) disengaging the nut and bolt assemblies 502 and 504 that engages the cartridge frame base 408 with the top flange 410 of the base frame 202. Further, the method can comprise (e) un-mounting the cartridge 102-1 by lifting the cartridge 102-1 upwards in the direction P from the base frame 202 of the multi-belt conveyor 100.

In accordance with some example embodiments, removing of the T-bolt may comprise, un-fastening or loosening the nut 312 of the T-bolt 302-1 to rotate the T-bolt 302-a counter-clockwise by 90 degrees and pulling out the T-bolt 302-1 from the slot 308, thereby disengaging the cartridge frame tops 304-1 and 304-2 of adjacently positioned cartridges 102-1 and 102-2.

By way of implementation of various example embodiments described herein, a conventionally tedious process for installation of a conveyor system (particularly, the multi-belt conveyor 100 that can be used for creating gaps between items positioned on the conveyor) in a material handling environment, can be simplified. For instance, a section of a conveyor can be un-mounted for maintenance purposes, by a single belt loosening action and removal of few bolts. Further, as the multi-belt conveyor 100 comprises the plurality of cartridges 102-1, 102-2 . . . 102-n, where any cartridge can be easily unmounted from a base frame without removing an adjacent cartridge, efforts required by operators for manufacturing, repair, installation, and maintenance of such conveyor systems can be significantly reduced, without compromising an operating performance of the conveyor system. Also, a modular structure of the multi-belt conveyor 100 based on multiple cartridges having set of conveyor belts that can be mounted on a base frame, while maintaining flat and even conveying surface along the length of the conveyor, multiple cartridges can be interchanged depending on a maintenance requirement. Further, this also allows fast and easy maintenance of the multi-belt conveyor 100, without compromising conveyor operation or gapping performance. Additionally, as the cartridges can be removed independent of a single motor drive which is present in conventional conveyors, implementation of various example embodiments described herein, allows for mechanical swapping of components of conveyor with minimal service interruption.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A conveyor comprising:
   a conveyor bed comprising a cartridge having a set of conveyor belts and a set of rollers, wherein each conveyor belt of the set of conveyor belts is individually mounted over an associated roller of the set of rollers, and wherein each of the conveyor belts of the set of conveyor belts are configured to move in a direction along the conveyor bed over the associated roller of the set of rollers at respective and individually defined speeds; and
   a plurality of T bolts, wherein each of the plurality of T bolts is configured to engage cartridge frame tops of two adjacently positioned cartridges of a plurality of cartridges.

2. The conveyor of claim 1, wherein the cartridge comprises:
   an actuation assembly comprising a drive pulley configured to be rotated about an axis;
   a roller-slider bed comprising a plurality of rollers configured to be rotated by the actuation assembly; and
   the set of conveyor belts mounted around the roller-slider bed and the drive pulley, wherein the set of conveyor belts are configured to move over the roller-slider bed in response to rotation of the drive pulley and the plurality of rollers.

3. The conveyor of claim 2, wherein the actuation assembly further comprises, a sprocket wheel mechanically coupled to a ball bearing and a shaft of the drive pulley, wherein the sprocket wheel is configured to be rotated by actuation of the actuation assembly that comprises: movement of a timing belt mounted around the sprocket wheel to cause rotation of the sprocket wheel, the ball bearing, and the shaft of the drive pulley.

4. The conveyor of claim 3, wherein the actuation assembly is actuated by a drive motor and wherein the timing belt is mounted around the sprocket wheel of the cartridge and a sprocket comprising a bushing that is mechanically coupled to a shaft of the drive motor.

5. The conveyor of claim 4, wherein the cartridge comprises a conveyor belt tensioning assembly comprising a first tensioning plate and first tensioning bolt, configured to adjust a tension of the set of conveyor belts mounted around the drive pulley and the roller-slider bed and wherein the base assembly comprises a timing belt tensioning assembly comprising a second tensioning plate and a second tensioning bolt, configured to adjust a tension of the timing belt mounted around the sprocket wheel of the cartridge and the sprocket with bushing at the base assembly.

6. The conveyor of claim 2, wherein the cartridge comprises:
   a cartridge frame defined by a cartridge frame top and a cartridge frame base and wherein the cartridge frame base is defined at an angle relative to the cartridge frame top and mechanically coupled to the cartridge frame top by a spring pin and a nut and bolt assembly; and a machined cross member comprising grooves and wherein the machined cross member is configured to support positioning of the plurality of rollers of the roller-slider bed of the cartridge, wherein the machined cross member is configured to engage with the cartridge frame top.

7. The conveyor of claim 6, wherein the cartridge is configured to be removably mounted over a base assembly of the conveyor by:

positioning the cartridge over the base assembly so that the cartridge frame base mates over a portion defined by a base frame of the base assembly;

engaging the cartridge frame base with the base frame by the nut and bolt assembly; and engaging a T-bolt between the cartridge and another cartridge positioned adjacently to the cartridge.

8. The conveyor of claim 6, wherein the cartridge is configured to control a positioning of the cartridge frame base relative to a conveying surface defined by the conveyor bed based on engagement of the cartridge frame top with the cartridge frame base and the base frame, and engagement of the cartridge frame top with the machined cross member.

9. The conveyor of claim 1, wherein a base assembly of the conveyor comprises:

a drive motor mounted to a base frame, the drive motor comprising a shaft through passing at least a portion of the base frame;

a sprocket comprising a bushing mechanically coupled to the shaft of the drive motor; and a tensioning plate positioned between the sprocket comprising the bushing and the base frame, wherein the tensioning plate comprises a plurality of slots configured to receive a plurality of face bolts to engage the tensioning plate on the base frame.

10. The conveyor of claim 1, wherein the conveyor comprises:

a first cartridge removably mounted to a base frame of the conveyor, the first cartridge comprising:
 a first actuation assembly comprising at least a first drive pulley;
 a first roller-slider bed comprising a first set of rollers configured to rotate by the first actuation assembly; and
 a first set of conveyor belts mounted around the first roller-slider bed and the first drive pulley, wherein the first set of conveyor belts are moved in response to rotation of the first set of rollers and the first drive pulley of the first actuation assembly; and a second cartridge removably mounted to the base frame, the second cartridge comprising:
 a second actuation assembly comprising at least a second drive pulley;
 a second roller-slider bed comprising a second set of rollers configured to rotate by the second actuation assembly; and
 a second set of conveyor belts mounted around the second roller-slider bed and the second drive pulley, and wherein the second set of conveyor belts are moved in response to rotation of the second set of rollers and the second drive pulley of the second actuation assembly; and wherein, the first set of conveyor belts are configured to be moved over the first set of rollers at a first speed and the second set of conveyor belts are configured to be moved over the second set of rollers at a second speed different from the first speed to create a gap between items on the conveyor bed of the conveyor.

11. The conveyor of claim 1, comprising the plurality of cartridges, wherein each of the plurality of cartridges is configured to be removed from the conveyor bed without removing an adjacent cartridge from the plurality of cartridges.

12. A cartridge of a conveyor comprising:

a roller-slider bed comprising a plurality of rollers;

a set of conveyor belts, wherein each conveyor belt of the set of conveyor belts is individually mounted over an associated roller of the roller-slider bed, and wherein each of the conveyor belts of the set of conveyor belts are configured to move over the roller-slider bed at respective and individually defined speeds in response to rotation of the plurality of rollers; and a conveyor belt tensioning assembly comprising a tensioning plate and tensioning bolt configured to adjust a tension of a set of conveyor belts mounted around the roller-slider bed.

13. The cartridge of claim 12, wherein the cartridge is configured to be removably mounted to a base frame of the conveyor comprising a conveyor bed that is defined by a plurality of conveyor belts, wherein each conveyor belt of the plurality of conveyor belts is configured to operate in a direction along the conveyor bed with at least one of, a same speed, a different speed, a same acceleration, or a different acceleration, at which a remaining conveyor belt of the plurality of conveyor belts of respective cartridges is to be operated.

14. The cartridge of claim 12, wherein the cartridge comprises a cartridge frame having a cartridge frame top and wherein the cartridge is configured to be removably mounted to a base assembly of the conveyor by:

positioning the cartridge over a base frame of the base assembly so that a cartridge frame base is positioned at in a defined orientation over a portion of the base frame;

engaging the cartridge frame base with the base frame by a nut and bolt assembly; and engaging a T-bolt between the cartridge frame top of the cartridge and another cartridge frame top of another cartridge positioned adjacent to the cartridge on the conveyor.

15. The cartridge of claim 12, further comprises an actuation assembly having a sprocket wheel mechanically coupled to a ball bearing and a shaft of a drive pulley, wherein the sprocket wheel is configured to be rotated by actuation of the actuation assembly that comprises: movement of a timing belt mounted around the sprocket wheel to cause rotation of the sprocket wheel, the ball bearing, and the shaft of the drive pulley.

16. The cartridge of claim 12, wherein the cartridge is configured to be removably mounted in a section of the conveyor based on engagement of a cartridge frame base with a base frame so that the roller-slider bed defined by the plurality of rollers of the cartridge aligns with a conveying surface defined by a conveyor bed of the conveyor.

* * * * *